Figure 1:
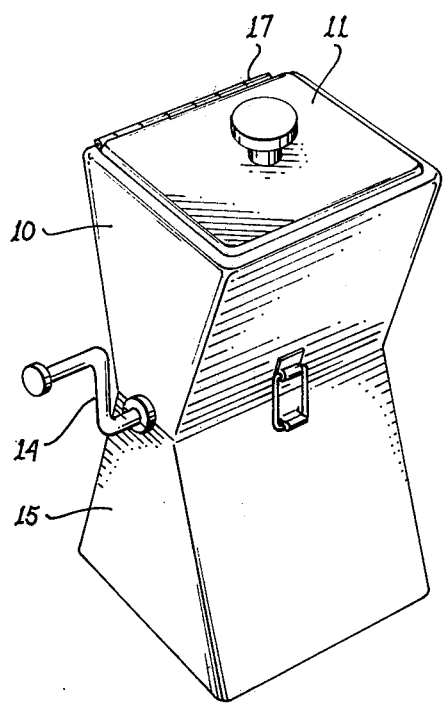

United States Patent [19]

Christianson

[11] 4,155,843

[45] May 22, 1979

[54] HERB GIN

[76] Inventor: Jerry L. Christianson, 232 N. Catherine St., Appleton, Wis. 54911

[21] Appl. No.: 852,299

[22] Filed: Nov. 17, 1977

[51] Int. Cl.² ............................................. B07C 5/36
[52] U.S. Cl. .................... 209/616; 209/633; 209/675; 209/283; 241/169.1
[58] Field of Search ............. 241/73, 169.1; 209/283, 209/390, 75, 77, 85, 616, 633, 675; 130/30 R, 30 E

[56] References Cited

U.S. PATENT DOCUMENTS

| 596,507 | 1/1898 | Hillman | 209/283 |
| 2,252,701 | 8/1941 | Copeman | 209/283 |

*Primary Examiner*—Allen N. Knowles
*Attorney, Agent, or Firm*—Cahill, Sutton & Thomas

[57] ABSTRACT

A gin for use with leafy herbs separates the leaves from the stems, seeds, and other debris. A rotary bristle brush is rotatably mounted in the lower end of a hopper to transfer the leaves from the hopper into a collection compartment. The collection compartment is attached to the lower end of the hopper and supports a concave grate meshing with the brush. On rotation of the brush, the leaves are forced through the grate and the stems, seeds, and debris are retainingly enmeshed within the brush bristles.

10 Claims, 4 Drawing Figures

U.S. Patent

May 22, 1979

4,155,843

HERB GIN

The present invention relates to gins and, more particularly, to gins for separating the leaves of herbs from the stems, seeds, and debris.

In the dried state, leafy herbs must be processed to separate the leaf portions from the attendant stems, seeds, hulls and debris. Such separation is often done manually with the attendant great consumption of time and/or expense. To speed up the separation process, various devices employing shaker boxes have been used. Such shaker boxes are effective but have certain disadvantages. If the leaf portions are fairly dry and crumble easily, a substantial percentage of the leaves fall through the apertures of the shaker box. And, when expensive herbs are processed, the losses attendant shaker boxes may be prohibitive.

Other devices have been developed for separating the leaves of herbs, which devices employ the principles of Eli Whitney's cotton gin. That is, mechanical fingers extend through a mesh to withdraw only the leaf portions of the herbs within a bin. However, since the stems, seeds, etc. may be of a size sufficiently small to drop through or be carried through the mesh by the fingers, complete segregation of the leaves is generally not achieved.

The herb gin of the present invention operates in conformance with principles essentially diametrically opposed to those attendant the cotton gin.

A concave grate is disposed beneath a hopper and a rotary bristle brush is mounted in close enough proximity to the grate whereby the bristles of the brush will repetitively extend through slots of the grate on rotation of the brush. The density of the bristle brush tends to preclude the leaf portions of the herbs from becoming enmeshed therein and the bristles will force the leaf portions through the grate. The stems, seeds, and debris become retainingly enmeshed within the bristles, which enmeshing is urged by the action of the grate tines penetrating intermediate the brush bristles. Thereby, even though the stems, seeds, and debris may be physically diminutive enough to pass through the grate, they are prevented from doing so by the brush itself. To maintain the enmeshing capability of the brush, it must be periodically combed or otherwise cleaned of the retained stems, seeds, etc. The leaf portions forced through the grate are collected within a suitably located collection compartment.

It is therefore a primary object of the present invention to provide a simple apparatus for extracting the leaves of herbs from attendant stems, seeds, and debris.

Another object of the present invention is to provide an inexpensive manual herb gin for domestic use.

Still another object of the present invention is to provide an herb gin for separating the leaf portions of any leaf herbs from debris attendant the herbs.

A further object of the present invention is to provide a leaf extractor for leafy herbs which breaks up clumps of herbs without serious damage to the leaves.

A still further object of the present invention is to provide an herb gin for separating the leaves of thyme and other condiments from the stems.

A yet further object of the present invention is to provide an herb gin for use with small quantities of leafy herbs.

These and other objects of the present invention will become apparent to those skilled in the art as the description thereof proceeds.

Figure 3:
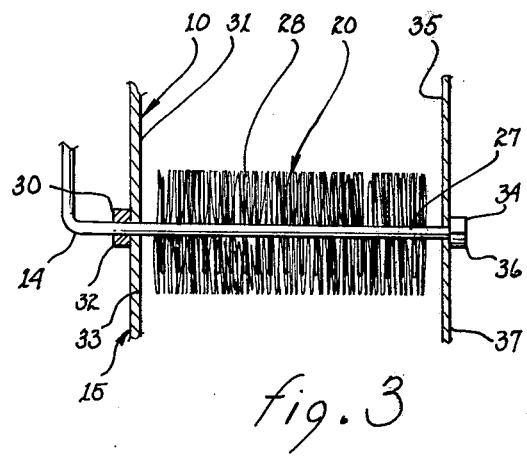
Figure 2:
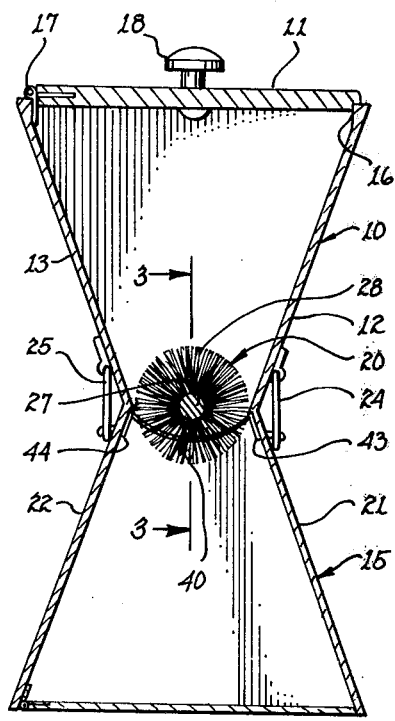

The present invention may be described with greater specificity and clarity with reference to the following drawings, in which:

FIG. 1 is a perspective view of an herb gin;
FIG. 2 is a cross-sectional view of the herb gin;
FIG. 3 is a cross-sectional view taken along lines 3—3, as shown in FIG. 2; and
FIG. 4 is an exploded view of the brush and grate relationship.

The herb gin illustrated in FIG. 1 includes a hopper 10 topped by a hinged lid 11. Opposed sides (of which side 12 is shown) slope downwardly and inwardly to a necked section adjacent the perimeter of an internal rotatably mounted bristle brush. Rotation of the brush may be effected through crank 14 or motive means (not illustrated). A collection compartment 15 is disposed beneath the necked section of hopper 10 to collect the leaf portions of the leafy herbs processed. A hinged bottom 19 may be included in the collection compartment to provide access to the processed leaves.

In operation, lid 11 is opened to allow loading of hopper 10 with leafy herbs, such as thyme or other condiments. Upon rotation of crank 14, the internal brush will rotate forcing the leaves of the herbs to drop into collection compartment 15. The stems, seeds, and debris of the herbs are enmeshingly retained within the brush. After a given period of operation, the brush will become marginally effective in its capacity for further enmeshing the stems, seeds, and debris. At this point, the brush may be removed and strained or otherwise cleaned of the enmeshed elements. Thereafter, operation of the herb gin may proceed. The processed leaves are removed from the collection compartment through hinged bottom 19.

Figure 4:
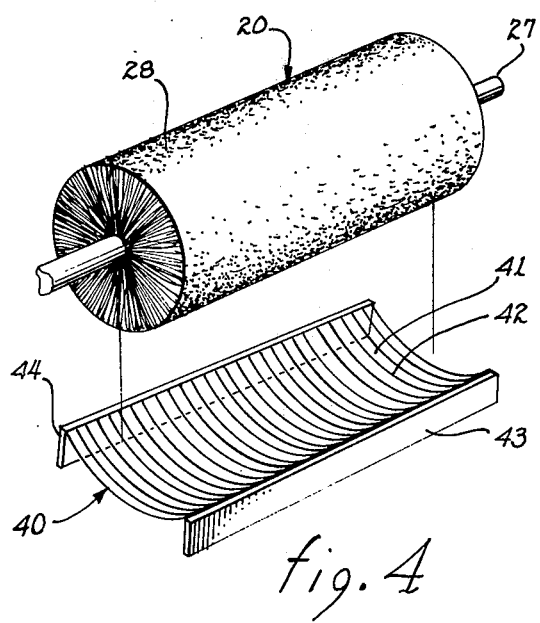

The internal structural details of the herb gin will be reviewed with reference to FIGS. 2, 3 and 4. Lid 11 is secured to opening 16 of hopper 10 by means of a hinge 17. A handle 18 may be provided to facilitate opening and closing of the lid. While only opposed sides 12 and 13 are shown as slanting downwardly and inwardly and terminated at a necked section, it is to be understood that the remaining two opposed sides may slope similarly whereby hopper 10 may resemble a reversed truncated pyramid. As is well known, the sloping sides of the hopper will tend to funnel or transport the leafy herbs toward rotary brush 20 disposed in the necked section.

Collection compartment 15 may include opposed downwardly outwardly oriented sides 21 and 22 extending from the necked section; the remaining two sides of the compartment may be similarly sloped or vertical, as illustrated.

To accommodate removal and cleaning of brush 20, as well as cleaning of both the hopper and collection compartment, the hopper is a separate structure having a lower end mountable upon and attachable to the upper end of the collection compartment through clasp means 24 and 25 disposed at the necked section.

Brush 20 includes a centrally mounted shaft 27 for supporting bristles 28. One end of shaft 27 is supported at the necked section of the herb gin through journal section 30 extending from side 31 of the hopper and journal section 32 extending from side 33 of the collection compartment; the other end of the shaft is supported at the necked section intermediate journal section 34 extending from side 35 of the hopper and journal section 36 extending from side 37 of the collection compartment. It may be noted that the paired journal sections form complete journals at opposed sides of the necked section.

By rotatably mounting shaft 27 in the above described manner, segregation of hopper 10 from compartment 15 through release of clasp means 24 and 25, readily permits removal of brush 20 for cleaning purposes or replacement.

A concave arcuate grate 40, as shown in FIG. 4, is permanently or removably attached to the upper end of collection compartment 15. Flanges 43 and 44 may be removably or permanently attached to opposed sides of the collection compartment. The grate defines a plurality of slots 41 of approximately 1/16 of an inch in width and separated from one another by tines 42. By mounting the grate in an interfering relationship with the bristles of brush 20, the bristles will penetrate the slots of the grate as the brush is rotated. That is, the bristles will continually sweep through slots 41 extending across the grate.

In operation, after hopper 10 has been filled with a leafy herb and upon rotation of brush 20, the bristles will urge the leaf portions toward the grate. On contact of the leaf portions with the slots in the grate, the bristles, being resilient and tending to penetrate these slots, will force the leaf portions through the grate. The general texture and large surface area of the leaf portions will tend to preclude them from becoming enmeshed within the bristles. The stems, seeds, and debris, being of a different texture and size from the leaf portions, will tend to penetrate the bristles or nap of the brush. Such penetration is further urged by tines 42 of the grate positioned intermediate the sweeping bristles. Once the stems, seeds, hulls and debris become transported into proximity with the base of the bristles, the reduced resiliency of the bristle bases will tend to retain the stems, seeds, and debris in place despite removal of the compressing effect of the tines. Thereby, the leafy portions are forced through grate 40 while the tines of the grate, in combination with the retaining effect of the base of the bristles, will preclude the stems, seeds, and debris from dropping through slots 41 into the collection compartment.

After brush 20 becomes loaded to the point where it can no longer retain the stems, seeds, and debris, it must be removed and cleaned, or replaced with a fresh brush.

Simultaneous with the removal of brush 20 or upon collection of a sufficient quantity of leaves within the collection compartment, the collection compartment may be opened to remove the leaves.

For domestic purposes, it is contemplated that the herb gin will be 10 inches high, 3 inches deep and 3 inches wide at its greatest width and depth. By using a brush of approximately 1½ inches in diameter and wherein the hopper and collection compartment are essentially mirror images of one another, a brush of this size is generally sufficient to process one filling of the hopper. Greater or lesser amounts may, of course, be processed, depending upon the amount of debris within the batch of herbs deposited within the hopper.

Should clumps of herbs be deposited within the hopper, the continual probing effect of the tips of the brush bristles will tend to catch upon the leaf portions to unravel and undo the clumps. Thus, preprocessing the leafy herbs is not necessary.

While the principles of the invention have now been made clear in an illustrative embodiment, there will be immediately obvious to those skilled in the art many modifications of structure, arrangement, porportions, elements, materials and components, used in the practice of the invention which are particularly adapted for specific environments and operating requirements without departing from those principles.

I claim:

1. A gin for separating the leaves from the stems, seeds and debris of a quantity of leafy plants, said gin comprising in combination:
   a. a hopper for housing the leafy plants, said hopper including a necked section;
   b. a grate disposed in proximity to the necked section of said hopper for separating the leaf portions of the leafy plants from the stems, seeds and debris, said grate including a plurality of tines defining adjacent slots;
   c. a rotary bristle brush including radially extending bristles for forcing the leaf portions through said slots in said grate, said brush being rotatably mounted in proximity to the necked section of said hopper to place said bristles in an interfering relationship with said grate and force said bristles to penetratingly sweep through said slots upon rotation of said brush; and
   d. a collection compartment for receiving the leaf portions swept through said grate;

whereby, upon rotation of said brush, the bristles engage the leaf portions and sweep the leaf portions through said slots of said grate and the stems, seeds and debris are compressed by said tines toward the center of said brush.

2. The gin as set forth in claim 1 wherein said grate is curved to increase the penetrating sweep distance of the bristles through said slots.

3. The gin as set forth in claim 2 wherein the curve of said grate is non-concentric with the axis of rotation of said brush.

4. The gin as set forth in claim 3 wherein said slots are 1/16 of an inch in width.

5. The gin as set forth in claim 1 including means for rotating said brush.

6. The gin as set forth in claim 5 wherein said brush is removably journalled in proximity to the necked section of said hopper.

7. The gin as set forth in claim 6 wherein said grate is curved to increase the penetrating sweep distance of the bristles through said slots.

8. The gin as set forth in claim 7 wherein the curve of said grate is non-concentric with the axis of rotation of said brush.

9. The gin as set forth in claim 8 wherein said hopper and said collection compartment include journal sections for journalling said brush therebetween.

10. The gin as set forth in claim 1 wherein two opposed sides of said hopper parallel to the axis of rotation of said rotary brush slope upwardly divergent to one another from a point in proximity to said grate.

* * * * *